(12) United States Patent
Lu et al.

(10) Patent No.: US 6,418,393 B1
(45) Date of Patent: Jul. 9, 2002

(54) THERMAL MODULE INSPECTING DEVICE

(75) Inventors: Chun-Hsin Lu; Pao-Lung Lin, both of Taipei; Nien-Tien Cheng, Tao-Yuan, all of (TW)

(73) Assignee: Foxconn Precision Components Co., Ltd., Taipei Hsien (TW)

( * ) Notice: Subject to any disclaimer, the term of this patent is extended or adjusted under 35 U.S.C. 154(b) by 0 days.

(21) Appl. No.: 09/221,648

(22) Filed: Dec. 28, 1998

(30) Foreign Application Priority Data

Oct. 9, 1998 (TW) ...................................... 87212763 U

(51) Int. Cl.⁷ .......................... G01K 1/00; G01K 3/00; G01K 5/00
(52) U.S. Cl. .................. 702/130; 702/132; 702/136; 374/45
(58) Field of Search .................. 702/99, 130, 132–136, 702/182–185, 82, 83; 703/3, 5; 361/694–697, 687, 700–703; 374/45, 52, 57, 100, 102, 152; 700/278, 299, 300; 340/501, 584, 589; 219/497

(56) References Cited

U.S. PATENT DOCUMENTS 4,479,727 A * 10/1984 Domingorena et al. ....... 374/45
4,653,934 A * 3/1987 Pursley ......................... 374/31
5,694,295 A * 12/1997 Mochizuki et al. .......... 361/699
6,246,969 B1 * 6/2001 Sinclair et al. ............... 702/113

OTHER PUBLICATIONS

Wang, David G. Ph. D. Cooling Solutions for a No–Air–Flow and Low–Junction–Temperature Application. Dec. 8–10, 1998. IEEE/CPMT Electronics and Packagin Technology Conference, Proceedings of 2nd. pp. 133–137.*

* cited by examiner

Primary Examiner—Marc S. Hoff
Assistant Examiner—Manuel L. Barbee
(74) Attorney, Agent, or Firm—Wei Te Chung

(57) ABSTRACT

An inspecting device for a thermal module for cooling a CPU of a computer to decide whether the module can work properly is disclosed. The device includes a computer stored with preset data. A measuring unit has a heater generating heat with a predetermined temperature. A converter electrically connects the heater with the computer and converts an analogous signal corresponding to the temperature of the heater to a digital signal which is sent to the computer. A force generating mechanism is provided on the measuring unit which can generate a pressing force toward the heater. When the heater is contact with a heat-generating component contact part of the thermal module and the force generating mechanism is activated to press the part against the heater, the computer compares the data stored therein and the signal received from the converter to determine whether the thermal module can attain its required performance.

7 Claims, 6 Drawing Sheets

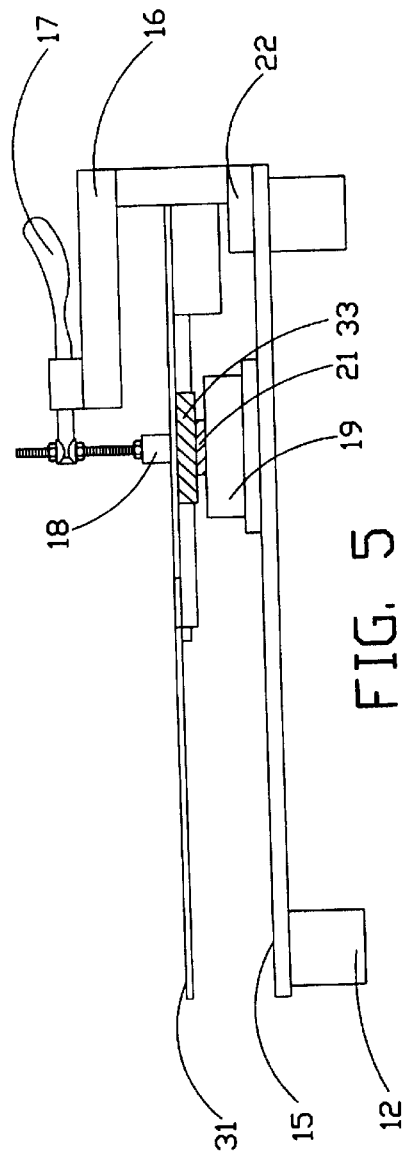
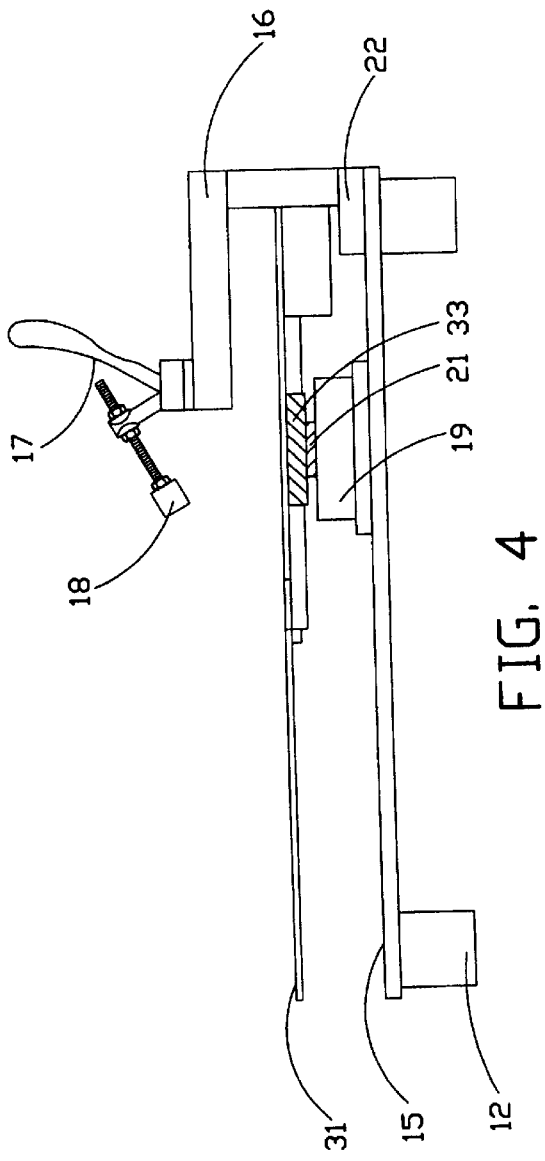

THERMAL MODULE INSPECTING DEVICE

BACKGROUND OF THE INVENTION

1. Field of The Invention

The present invention relates to a device for inspecting a thermal module, and particularly to a device for inspecting a thermal module which is used in a notebook computer for cooling a heat-generating component, for example, a central processing unit (CPU) thereof.

2. The Prior Art

Following the miniaturization of notebook computers and the high power consumption of the CPUs thereof, thermal modules have been developed which can be received in the small spaces of the notebook computers while effectively dissipate heat generated by the CPUs thereof. Each thermal module generally consists of an aluminum plate, an aluminum block attached to the plate for contacting with the CPU, a heat pipe attached the plate and so extended that it has at least a portion contacting with the aluminum block and an end contacting with a heat sink also attached to the plate. To enhance the heat dissipating effectiveness of the heat sink, a fan is mounted to the heat sink.

The heat generated by a CPU is first absorbed by the aluminum block and then transmitted to the heat sink via the heat pipe. Finally, the heat is dissipated to atmosphere by an air flow generated by the fan through heat dissipating fins of the heat sink.

As the overall performance of the thermal module is greatly affected by the heat pipe which is a component whose reliability is not always assured after a manipulation, for example, a bending thereof, each thermal module should be inspected concerning the performance thereof before it is mounted in a corresponding computer.

However, until now there is no inspecting device which can quickly determine the performance of a thermal module to decide whether it can work properly thereby preventing the mounting of a defective thermal module into the computer.

SUMMARY OF THE INVENTION

Accordingly, an objective of the present invention is to provide an inspecting device which can quickly and conveniently determine the performance of a thermal module to decide whether it can work properly before it is mounted to the computer.

To fulfill the above mentioned objective, according to one embodiment of the present invention, a thermal module inspecting device consists of a frame forming two decks on each of which three measuring units are mounted, and a computer mounted on a top of the frame. The computer is stored with preset data therein. Each measuring unit consists of a bed, a heater mounted on the bed, a thermally conductive block mounted on the heater, a bracket mounted on the bed about an edge thereof, and a force generating mechanism pivotably mounted on the bracket. The force generating mechanism consists of a pressing rod and a handle which are so connected that when the handle is moved toward the rod, the rod is activated away from the heater. Alternatively, when the handle is moved away from the rod, the rod is activated toward the heater. A converter converts an analogous signal representing a temperature of the heater to a digital signal which is then input into the computer.

In operation, the heater is supplied with an electrical power to have its temperature raised to a predetermined degree. A thermal module to be inspected is then mounted to a corresponding measuring unit in which an aluminum block of the module contacts with the thermally conductive block. The force generating mechanism is activated to have its pressing rod moved toward the heater to press the thermal module against the thermally conductive block. The aluminum block of the module absorbs the heat of the heater via the thermally conductive block. The absorbed heat is transmitted to a heat sink via a heat pipe whereby the heat is dissipated to atmosphere by an air flow generated by a fan through the heat sink. The computer compares the preset data stored therein and the temperature of the heater which has been lowered from the predetermined degree due to the contact between the thermally conductive block and the aluminum block of the thermal module. If a difference between the stored data and the detected temperature exceeds a certain numeric range within a period of time, the computer will give a message indicating that the thermal module can work properly. Otherwise, the computer will indicate that the thermal module cannot attain its intended function.

BRIEF DESCRIPTION OF THE DRAWINGS

FIG. 4 is a side view of FIG. 3, with a pressing rod being activated away from the thermal module;

FIG. 5 is a side view of FIG. 3, with the pressing rod being activated toward the thermal module;

DETAILED DESCRIPTION OF THE PREFERRED EMBODIMENT

Reference will now be made in detail to the preferred embodiment of the present invention.

Figure 1:
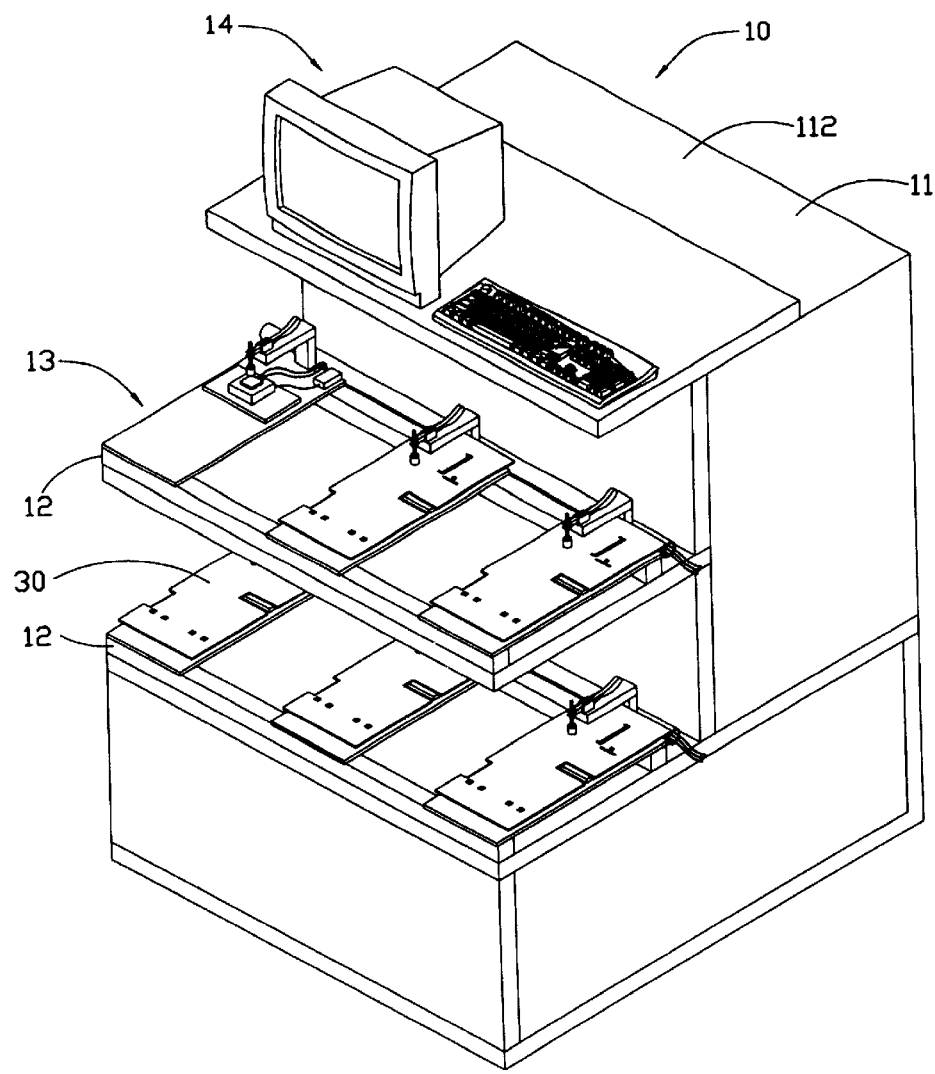
FIG. 1 is a perspective view of a thermal module inspecting device in accordance with the present invention, wherein five thermal modules are mounted to five of six measuring units of the device.

Referring to FIG. 1, a thermal module inspecting device 10 in accordance with the present invention generally consists of a frame 11 forming a top wall 112 and two decks 12 therebelow, a computer or a data processing device 14 put on the top wall 112 of the frame 11, and three thermal module measuring units 13 mounted on each of the two decks 12 of the frame 11. The computer 14 is used to compare a detected signal from an inspected thermal module with a preset data stored in the computer 14 to decide whether the performance of the thermal module can meet a predetermined requirement; detailed descriptions concerning this are given below.

Figure 6:
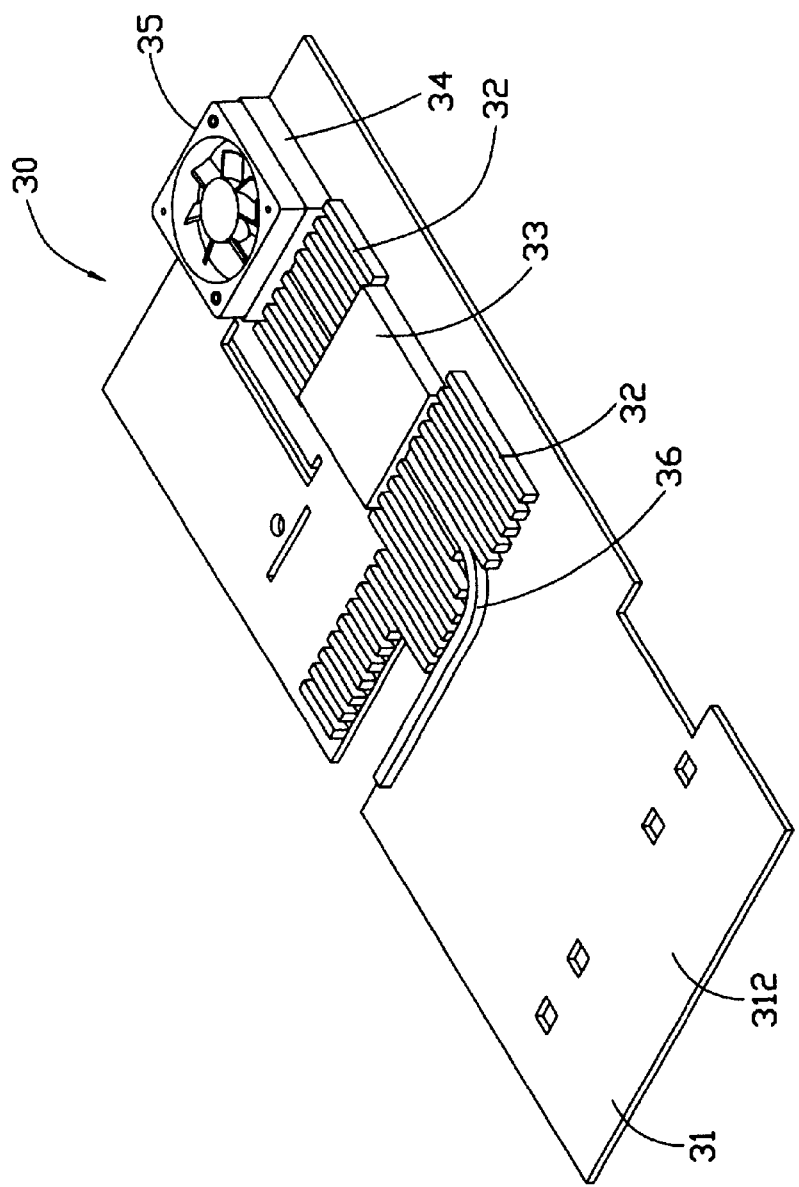
FIG. 6 is a perspective view showing a top face of the thermal module.
Figure 7:
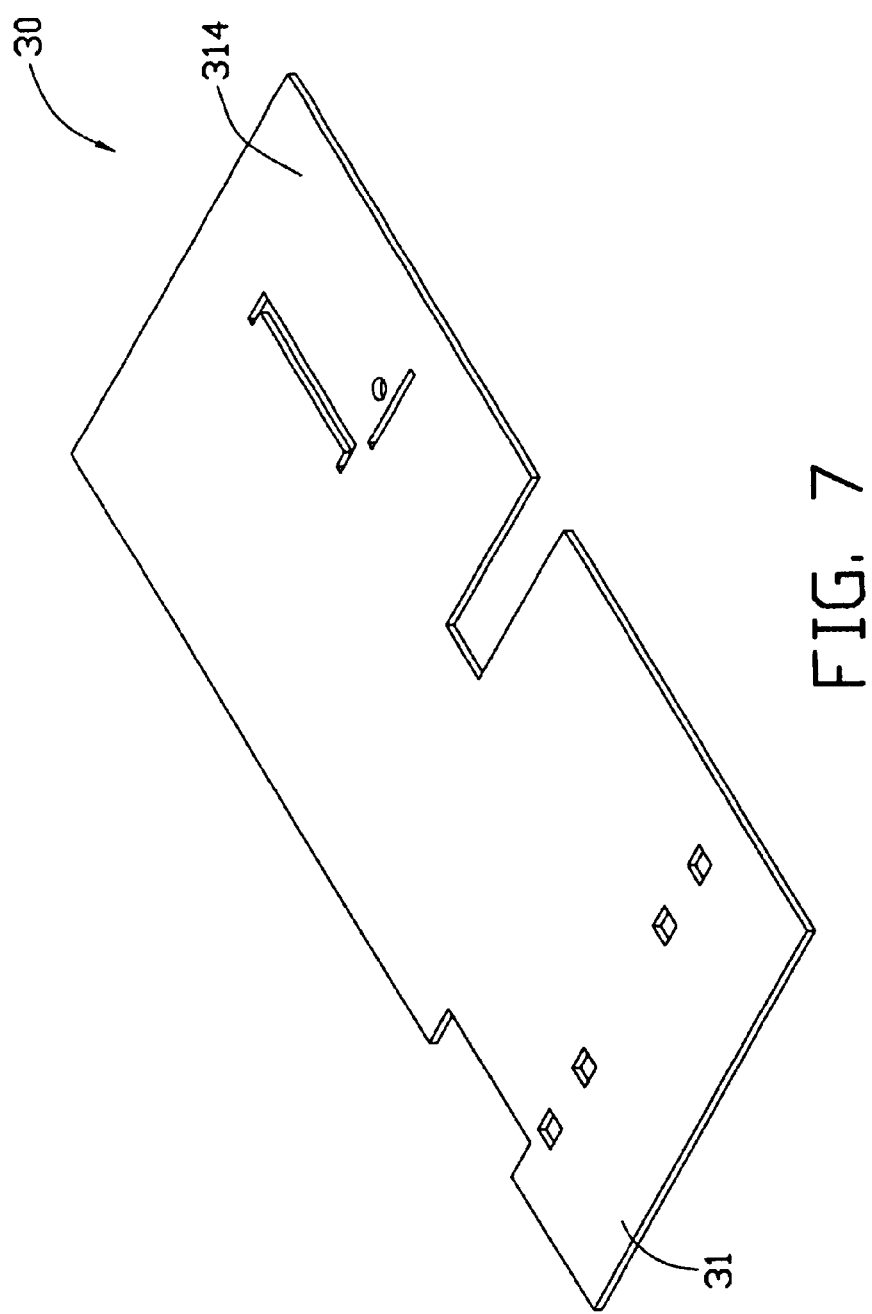
FIG. 7 is a perspective view showing a bottom face of the thermal module.

Referring to FIGS. 6 and 7, a thermal module 30 in accordance with the preferred embodiment of the present invention includes an aluminum plate 31 having a top face 312 and a bottom face 314, and the following components commonly attached to the top face 312 of the aluminum plate 31: two groups of aluminum bars 32, an aluminum block 33 between the two groups of the aluminum bars 32, a heat sink 34 made by aluminum extrusion located near a side edge of the plate 31, a fan 35 mounted on the heat sink 34 and a heat pipe 36 made of copper alloy extending between the aluminum bars 32 and having a middle portion (not shown) in contact with the aluminum block 33 and an end (not shown) in contact with the heat sink 34. The aluminum bars 32 are provided for increasing the heat dissipating effectiveness of the thermal module 30. The aluminum block 33 is used for contacting with a heat-generating component, for example, a CPU of a computer (not shown) to absorb heat generated thereby. The heat absorbed by the aluminum block 33 is then transmitted to the heat sink 34 via the heat pipe 36 to be dissipated to atmosphere by an air flow caused by the fan 35 through the heat sink 34.

Figure 2:
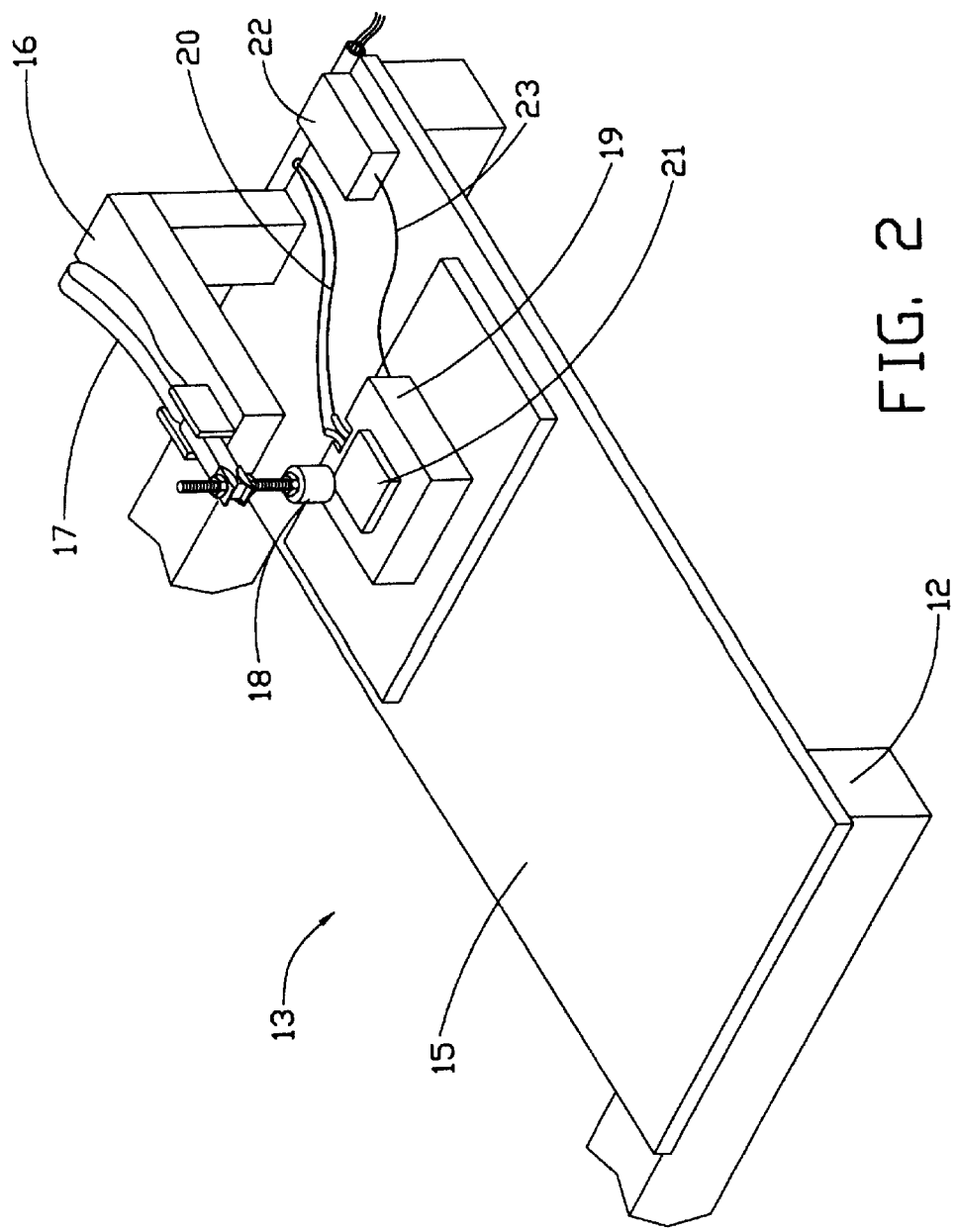
FIG. 2 is a perspective view of one of the measuring units of the thermal module inspecting device of FIG. 1.

Referring to FIG. 2, each measuring unit 13 consists of a bed 15 mounted on a corresponding deck 12, a heater 19 mounted on the bed 15, a thermally conductive block 21 mounted on the heater 19, an L-shaped bracket 16 mounted on an edge of the bed 15 for pivotably supporting a force exerting mechanism consisting of a handle 17 actively connecting with a pressing rod 18. The handle 17 and the pressing rod 18 are so connected that when the handle 17 is pivoted toward the rod 18, the rod 18 is activated away from the heater 19 (FIG. 4). Alternatively, when the handle 17 is pivoted away from the rod 18, the rod 18 is activated toward the heater 19 (FIG. 5). The connecting structure between the handle 17 and the rod 18 is known by those skilled in the art; thus, a detailed description thereof is omitted herefrom.

Two power lines 20 electrically connect a power source (not shown) with the heater 19 whereby electrical power can be supplied to the heater 19 to cause it to heat to a predetermined temperature. A thermal couple (not shown) is inserted into the heater 19 and connects with a signal converter or a temperature detector 22 via a signal line 23. The converter 22 receives an analogous signal representing the temperature of the heater 19 from the thermal couple (not shown) and converts it to a corresponding digital signal which is then fed into the computer 14 via another signal line (not shown) connecting the converter 22 and the computer 14.

Figure 3:
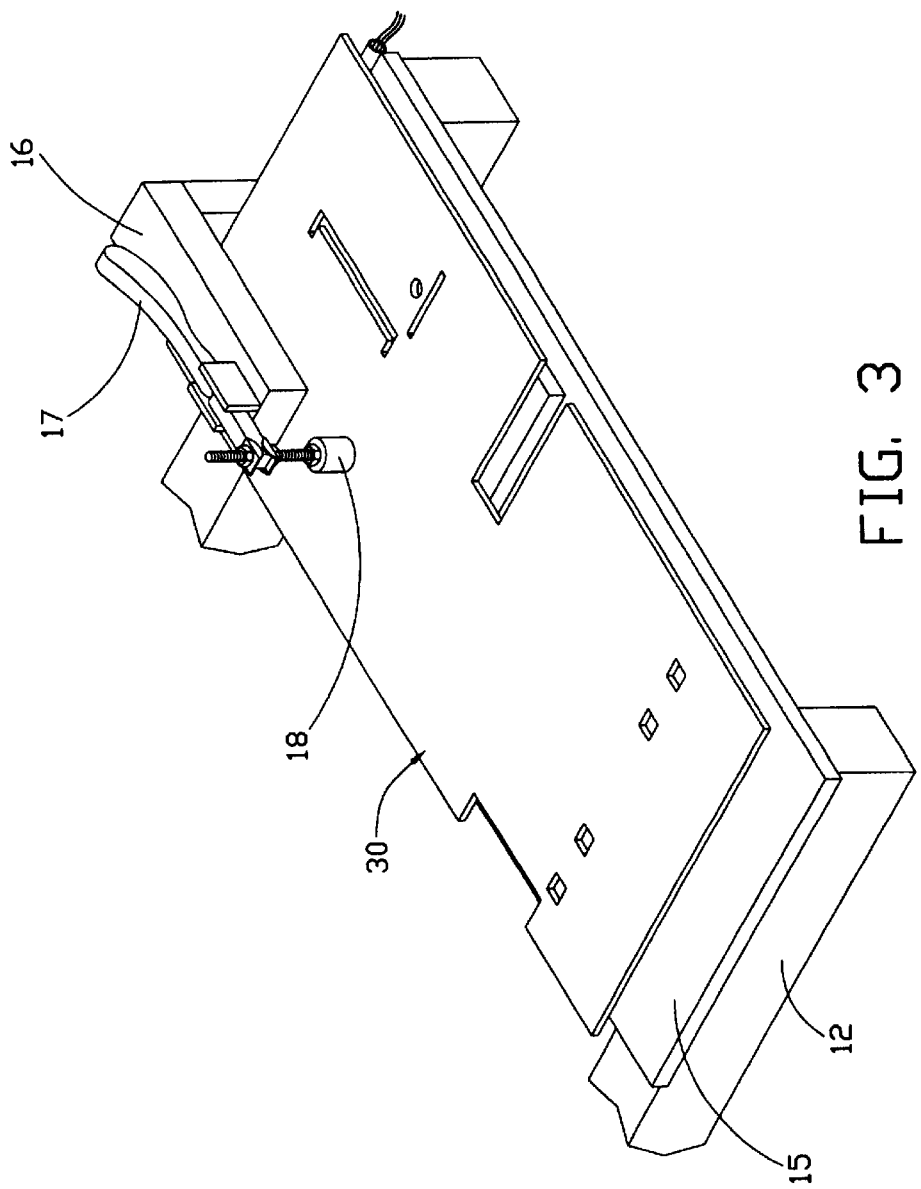
FIG. 3 is a view similar to FIG. 2 with a thermal module mounted to the measuring unit for inspection.

In operation, also referring to FIGS. 3–5, the temperature of the heater 19 of the measuring unit 13 is increased to a predetermined degree like that of a CPU of a computer which has run for a period of time. Then, a thermal module 30 to be inspected is put onto the measuring unit 13 to a position wherein the aluminum block 33 of the thermal module 30 is in contact with the thermally conductive block 21 on the heater 19. The handle 17 is pivoted away from the pressing rod 18 to activate the rod 18 toward the heater 19 exerting a pressing force on the bottom face 314 of the mounting plate 31, whereby the aluminum block 33 is tightly engaged with the thermally conductive block 21 by a force. The force is set as large as the engaging force of the aluminum block 33 with the CPU when the thermal module 30 is assembled to the computer. As soon as the pressing rod 18 is activated to press the thermal module 30 against the thermally conductive block 21, the heat generated by the heater 19 is absorbed by the aluminum block 33 via the thermally conductive block 21. The absorbed heat is transmitted to the heat sink 34 via the heat pipe 36 and is finally dissipated to atmosphere by an air flow generated by the fan through the heat sink 34. Thus, the temperature of the heater 19 starts to be lowered from the predetermined degree. Signal representing the lowered temperature is transmitted to the computer 14 via the thermal couple (not shown) in the heater 19, the signal line 23, the converter 22 and the signal line (not shown) connecting the converter 22 and the computer 14. The computer 14 compares the received signal with the preset data stored therein. If a difference between the received signal and the preset data exceeds a certain numeric range within a preset period of time from the start of inspection, the computer 14 will show that the thermal module 30 can work properly. Otherwise, the computer 14 will show that the thermal module 30 cannot pass the inspection.

In brief, the invention provides a system for inspecting efficiency and workability of a heat-dissipating thermal module wherein said system includes a heating means for generating heat with a first predetermined temperature, and a temperature detector thermally connecting preferably to said heating means whereby the module is attached to said heating means for a specific period, and may pass the inspection if the resulting temperature obtained from the temperature detector complies with a second preset or predetermined temperature. In the embodiment, the computer may efficiently, quickly and largely process the data obtained from different modules, simultaneously.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. An inspecting device for determining the workability of a thermal module, said thermal module being used for dissipating heat from a heat-generating component of a computer and comprising a part for contacting with the heat-generating component, a heat pipe having a portion in thermal connection with the part and another portion in thermal connection with a heat sink, the inspecting device comprising:
   a frame;
   a computer mounted on the frame and stored with preset data;
   a measuring unit mounted on the frame and comprising:
      heating means for generating heat with a predetermined temperature;
      signal converting means for converting analogous temperature signal received from the heating means to digital signal to be received by the computer; and
      force generating means for generating a pressing force toward the heating means;
   wherein when the heating means reaches the predetermined temperature and contacts with the heat-generating component contacting part of the thermal module, and the force generating means exerts a pressing force on the module against the heating means, the computer compares the digital signal received from the converter with the preset data stored therein to determine whether the thermal module can work properly.

2. The inspecting device in accordance with claim 1, wherein the force generating means comprises a handle and a pressing rod pivotably connected to a bracket of the measuring unit, the handle and the rod being so connected that when the handle is pivoted toward the rod, the rod is activated away from the heating means, and when the handle is pivoted away from the rod, the rod is activated toward the heating means.

3. The inspecting device in accordance with claim 1 further comprising a thermally conductive block on the heating means for contacting with the heat-generating component contacting part of the thermal module.

4. The inspecting device in accordance with claim 1, wherein the frame forms a top wall on which the computer is mounted, and two decks below the top wall, on deck three measuring units being mounted.

5. The inspecting device in accordance with claim 1, wherein the heating means generates heat by electrical power.

6. An inspection system for determining efficiency and workability of a heat-dissipating thermal module, comprising:

a frame;

a measuring unit mounted on the frame and comprising:

heating means for generating heat with a predetermined temperature;

a temperature detector connected to said heating means; and force generating means for tightly pressing the module against the heating means; whereby when the heating means reaches the predetermined temperature and the module is tightly pressed against the heating means by the force generating means for a period, the temperature detector may obtain a resulting temperature which will be compared with a second predetermined temperature for deciding if the module passes inspection.

7. The system in accordance with claim 6, wherein the system further includes a data processing device which is stored with preset data, and said temperature detector is a signal converting means for converting analogous temperature signal received from the heating means to digital signal to be received by said data processing device and compared with said preset data.

* * * * *